US006662008B1

(12) United States Patent
Dolan et al.

(10) Patent No.: US 6,662,008 B1
(45) Date of Patent: Dec. 9, 2003

(54) SYSTEM AND METHOD FOR TESTING A COMMUNICATION SYSTEM

(75) Inventors: Tommy Dolan, Dublin (IE); Per Green, Jarfalla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 479 days.

(21) Appl. No.: 09/609,635

(22) Filed: Jul. 3, 2000

(51) Int. Cl.[7] ................................................ H04Q 7/20
(52) U.S. Cl. ................. 455/423; 455/67.14; 455/67.11; 455/424; 455/425
(58) Field of Search ............................... 455/423, 67.1, 455/115, 226.1, 424, 425, 67.14

(56) References Cited

U.S. PATENT DOCUMENTS

| | | | |
|---|---|---|---|
| 5,353,332 A | | 10/1994 | Raith et al. |
| 5,481,588 A | * | 1/1996 | Rickli et al. ............. 379/32.01 |
| 5,625,869 A | * | 4/1997 | Nagamatsu et al. ........ 455/411 |
| 6,141,546 A | * | 10/2000 | Thomas et al. ............. 455/424 |
| 6,430,410 B1 | * | 8/2002 | Staber ........................ 455/423 |
| 6,434,364 B1 | * | 8/2002 | O'Riordain .............. 455/67.11 |

FOREIGN PATENT DOCUMENTS

| | | |
|---|---|---|
| GB | 2314484 | 12/1997 |
| WO | WO98/39943 | 9/1998 |

\* cited by examiner

*Primary Examiner*—William Trost
*Assistant Examiner*—Sharad Rampuria

(57) ABSTRACT

A technique for testing a communication system involves establishing a Test System Identification value (TSID value) to represent a test system and associated test activity within the communication system. Mobile stations which are members of the test system are allowed access to test resources in the communication system. In a first embodiment, to provide access to the test resources, the test system can broadcast the TSID value on a control channel. A mobile station receives the control channel and compares the broadcast TSID value with numeric information stored in its internal memory. Upon a match, the mobile station is permitted to camp on the control channel of the test system and use its resources. In a second embodiment, the mobile station may gain access to test resources by broadcasting its TSID value to higher-level nodes of the communication system. Still alternatively, the higher-level nodes of the communication system may independently ascertain the test membership status of the mobile station based on other mobile-identifying information supplied by the mobile station.

17 Claims, 4 Drawing Sheets

SYSTEM AND METHOD FOR TESTING A COMMUNICATION SYSTEM

BACKGROUND

The present invention relates to a system and method for testing resources in a communication system.

FIG. 1 illustrates a conventional cellular radio system 100. The radio system 100 provides communication service to a plurality of cells C1–C5. A plurality of fixed base stations (116–124) serve the respective cells C1–C5. Each base station includes a transmitter, receiver, and base station controller (not shown). The base stations (116–124) are connected to and controlled by a plurality of mobile service switching centers (MSCs), e.g., MSC 126 and MSC 128. Namely, MSC 126 serves base stations 116 and 124, while MSC 128 serves base stations 118, 120, and 122. The MSCs 126 and 128, in turn, are connected to a public switched telephone network (PSTN) (not shown). The MSCs 126 and 128 are also connected to a home location register (HLR) 130. The radio system 100 defined by the base stations (116–124), MSCs (126 and 128), and HLR 130 provides communication services to the exemplary set of mobile stations (102–114) scattered about the radio coverage area of the system 100.

In one exemplary standard, a subset of radio frequencies is assigned to each of the cells C1–C5 for communicating with the mobile stations within the coverages of the cells. Each subset of channels may be divided into plural voice or data channels used to carry voice or data and one or more paging/access or control channels used to convey supervisory data messages between the mobile stations (102–114) and their respective base stations (116–124). The control information may specifically pertain to outgoing call signal information, incoming call signal information, paging signals, location registration signals, etc.

Among other tasks, the MSCs (126 and 128) switch calls between and among wireline and mobile subscribers, control signaling to the mobile stations, and administer the operation and maintenance of the system 100. The HLR 130 maintains a database storing an indication of the MSC associated with the last known location of each subscribing mobile station. In use, the HLR 130 routes calls directed to a mobile station to its associated MSC. The system 100 updates the location information stored in the HLR 130 when a mobile station roams into a new MSC area. The HLR 130 also stores information regarding services allocated to the subscribers, such as call forwarding on busy, private number plans, etc. Subscriber services are maintained by the HLR 130 using subscriber categories.

The efficient administration of a radio system of the above-described type requires occasional testing of system resources. For example, new or updated resources (such as a new antenna system) may require initial testing to ensure that the resources are functioning properly. Previously-deployed resources may require testing in conjunction with routine maintenance, or when the operator suspects that the resources are performing in a substandard manner.

To provide the most reliable results, testing conditions should closely resemble the normal operation of the communication system. It is possible to test the resources by deploying the resources and then allowing the general population of subscribers to use the resources. However, the reliability of the resources may be uncertain. It is often considered undesirable to subject the general population of subscribers to potentially faulty resources, which may result in lost calls and other service anomalies. To address this concern, it is common to restrict access to the monitored test resources to a pilot group of mobile stations. The operator monitors the interaction between these pilot stations and the monitored test resources. Once satisfied that the resources are performing in a reliable manner, the operator allows all subscribers to access the monitored test resources.

However, the efficient creation of a pilot group of test users has proven challenging. One technique used by the present inventors to accomplish this task is to modify the system information stored in the MSC and/or HLR. Namely, a group of "friendly" test mobile stations can be created by modifying the subscriber categories and routing analysis defined in the MSC and/or HLR. In effect, these modifications create a temporary patch in the routing and switching analysis provided by the MSC and/or HLR. However, modifying the subscriber categories requires a significant amount of administrative data changes. Also, the higher-level nodes in a radio system (such as the HLR node) may be administered by different business entities than the lower nodes (such as the base station controllers). Thus, an operator of a lower-level node may lack suitable access to the subscriber categories to make the required changes, or may lack sufficient confidence in the reliability of changes made on the operator's behalf.

It is accordingly an exemplary objective of the present invention to provide a technique for testing communication resources in a more efficient and reliable manner than the above-described approaches.

SUMMARY

These and other exemplary objectives are achieved according to the present invention by using a Test System Identification value (TSID value) to represent a test system and associated test activity within a communication system. Mobile stations which are members of the test system are allowed access to test resources in the communication system. In a first embodiment, to provide access to the test resources, the test system can broadcast the TSID value on a control channel. A mobile station receives the control channel and compares the broadcast TSID value with numeric information stored in its internal memory. Upon a match, the mobile station is permitted to camp on the control channel of the test system and use its resources. In a second embodiment, the mobile station may gain access to test resources by transmitting its TSID value to higher-level nodes of the communication system (without first receiving and comparing a broadcast TSID value). Still alternatively, the higher-level nodes of the communication system may independently ascertain the test membership status of the mobile station based on other mobile-identifying information supplied by the mobile station.

The dedication of TSID-defined test systems to testing activities allows an operator to quickly set up (and later deactivate) a set of "friendly" test mobile stations without making burdensome changes to subscriber categories maintained by the higher nodes of the communication system.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 1:
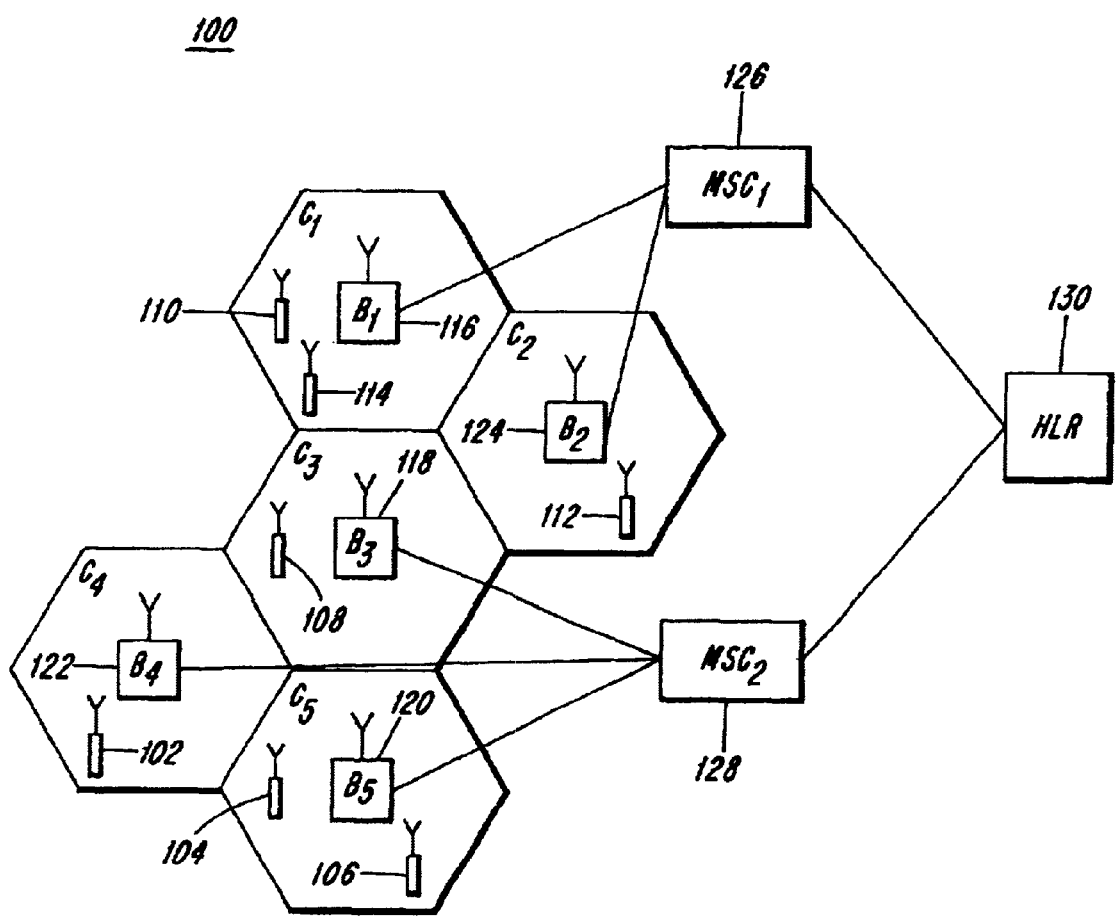
FIG. 1 shows a conventional radio communication system.

In the following description, for purposes of explanation and not limitation, specific details are set forth in order to provide a thorough understanding of the invention. However it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail. In the drawings, like numerals represent like features.

At the outset, it should be noted that the invention applies to a wide variety of communication systems (cellular, satellite, etc.), access techniques (such as FDMA, TDMA, CDMA, hybrid FDMA/TDMA/CDMA), architectures (macrocells, microcells, picocells), operational modes (such as analog, digital, dual-model), and standards (such as IS-136 (DAMPS), IS-95 (CDMA), EIA/TIA-553 (AMPS), GSM, Narrow-band AMPS (NAMPS), PCS, TACS, etc.).

Figure 2:
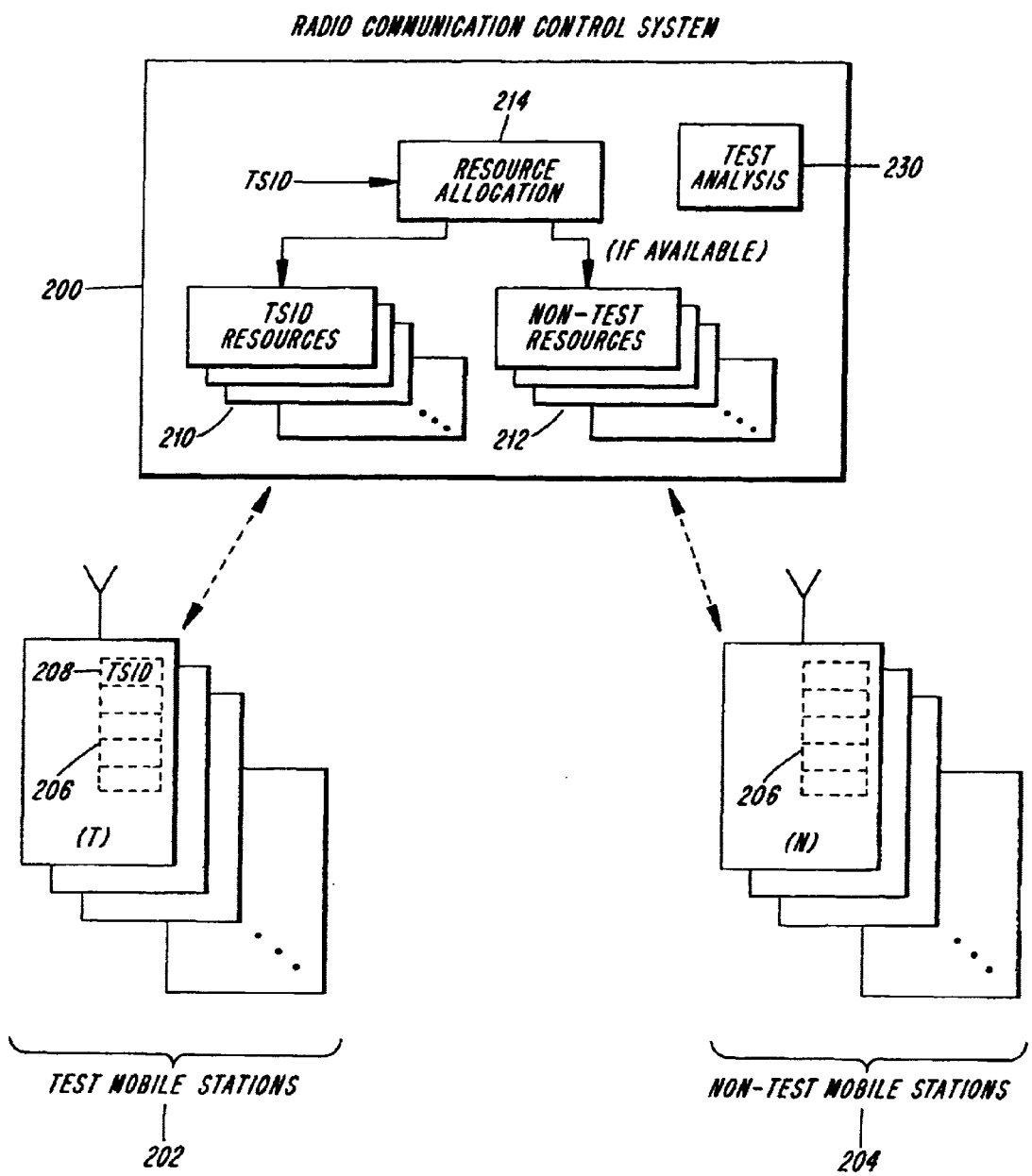
FIG. 2 illustrates the interaction between a radio communication control system and its associated mobile stations according to one example of the testing technique of the present invention.

FIG. 2 shows an overview of the testing environment. The environment broadly includes a radio communication control system 200 in communication with a plurality of mobile stations (202, 204). The communication control system 200 may, for example, represent an architecture similar to that shown in FIG. 1. Namely, the control system 200 may include a plurality of base stations assigned to a plurality of respective cells communicating with one or more mobile switching centers (MSCs), which, in turn, may be connected to one or more home location registers (HLRs). A plurality of subsets of channels used in the system may be divided into plural voice or data channels used to carry voice or data and one or more paging/access or control channels used to convey supervisory data messages between the mobile stations and their respective base stations.

The radio communication system 200 includes plural resources. The term "resources" refers to any feature of the radio communication system, including any hardware or software module used in the mobile stations, base stations, MSCs, HLRs, etc. The resources that are used for test activities are referred to as test or "TSID" resources 210. The test resources 210 collectively define a test system. The operator may be interested in specifically monitoring the performance of certain resources. These resources are referred to as "monitored test resources." For instance, the operator may introduce a new antenna system. All of the communication resources used in testing the antenna system constitute the testing resources 210. The antenna system itself comprises the monitored test resource.

The control system 200 also includes a number of non-test resources 212. The non-test resources 212 pertain to resources used in performing non-test activities at the direction of non-test users (if permitted). The non-test resources collectively define one or more non-test systems. The test system and non-test systems may share some common resources within the control system 200.

Correspondingly, mobile stations that are permitted to access the test system are referred to as test mobile stations 202. Mobile stations that may be permitted to access the non-test system (but not the test system) are referred to as non-test mobile stations 204.

The resource allocation block 214 broadly indicates that the control system 200 includes functionality for allocating test and non-test resources to mobile stations. For example, in a first embodiment, allocation can take the form of configuring a cell so that it only provides service to the test mobile stations 202. In this circumstance, the control system 200 may prohibit non-test mobile stations 204 from establishing any communication within the cell. Alternatively, in a second embodiment, allocation can take the form of receiving communication from both test mobile stations 202 and non-test mobile stations 204, discriminating the status of the mobile stations as test mobile stations 202 or non-test mobile stations 204, and then providing access to the test resources 210 and non-test resources 212 as appropriate to the status of each mobile station.

The test system is represented by (and administered with respect to) an associated Test System IDentification value (TSID value). As noted above, the TSID-based test system is supported by the resources of control system 200 which also may support a general class of non-test subscribers (e.g., non-test mobile station subscribers 204 with access to non-test system(s)). Nevertheless, the test system may be conceptually regarded as "separate" from the general-subscriber aspects of the control system 200 in much the same way that a communication system of one commercial provider is considered as separate from the communication system of another commercial provider (e.g., in much the same way that a private communication system is considered as "separate" from an overlapping public communication system). The use of the TSID-affiliation to allocate resources is represented in FIG. 2 by the "TSID" input to the resource allocation block 214.

The test mobile stations 202 preferably comprise conventional communication devices. For instance, these test mobile stations may include a microprocessor (not shown) connected to input/output devices, such as keypad (not shown), display (not shown), and speaker (not shown). A transceiver (not shown) is also connected to the microprocessor. The transceiver, in turn, is connected to an antenna (not shown). The mobile station further contains a memory 206 for storing information used by the mobile station to communicate with the control system 200, such as a mobile identification number ("MIN"), home system identification number(s) ("SID"), private system identification number(s) ("PSID"), residential system identification number(s) ("RSID"), mobile country code ("MCC"), mobile network code ("MNC"), etc. The specific set of numeric indicia stored in the memory 206 is standard-specific.

The test mobile station memory 206 can also store a TSID value 208 (or plural TSID values). As will be discussed in greater detail in the context of FIGS. 3 and 4, in a first embodiment, the stored TSID value 208 can be used for comparison with broadcast TSID values transmitted in the control channel of the cell(s) occupied by the test system. In a second embodiment, a test mobile station can also independently forward its stored TSID value to the control system 200 to convey its test system membership status.

An operator can program the TSID values (as well as other numeric fields) into the test mobile stations 202 in a conventional manner. For instance, the numeric fields can be programmed into the mobile stations at the sales location at the time of purchase or lease of the mobile stations. Alternatively, the numeric fields can be downloaded by the control system 200 via wireless communication after the purchase of the test mobile stations.

The non-test mobile stations 204 have the same structural configuration as the test mobile stations 202. However, the non-test mobile stations 204 do not include TSID values stored in their respective memories because they are not associated with the test system.

A test analysis module 230 provides a variety of tools for monitoring and analyzing the tests performed by the control system 200. For instance, the control system 200 can support concurrent testing of different resources, permitted a side-by-side comparison of their performance using the test analysis module 230. In this context, the resource under investigation is referred to as the "monitored test resource," while the resource used for comparison purposes is referred to as the "baseline resource."

Figure 3A:
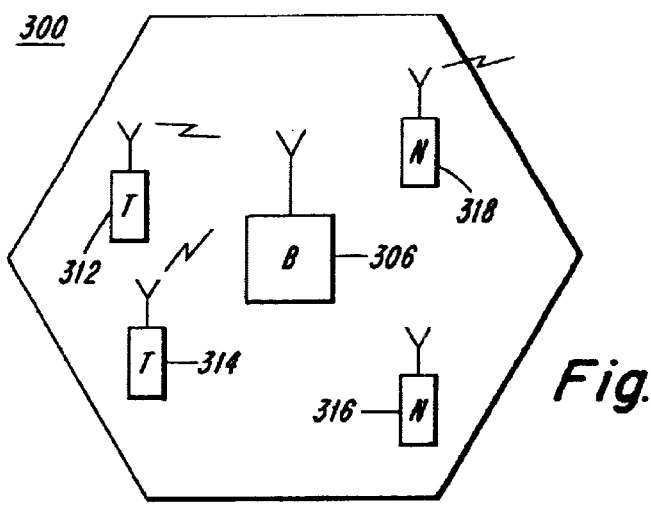
FIGS. 3(a), 3(b), and 3(c) respectively show three applications of the testing technique of the present invention.
Figure 3B:
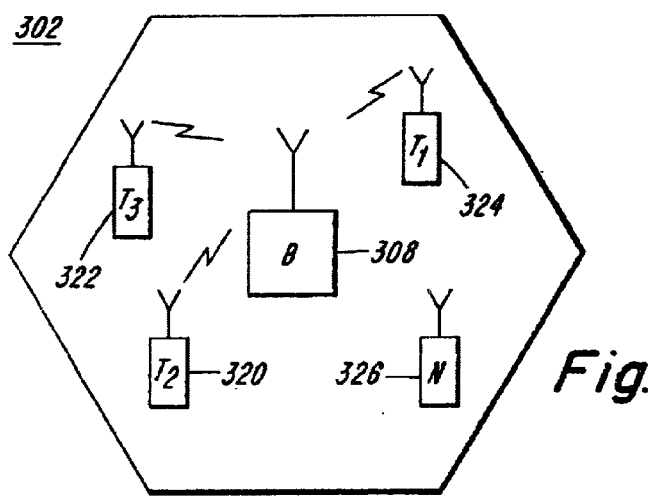
Figure 3C:
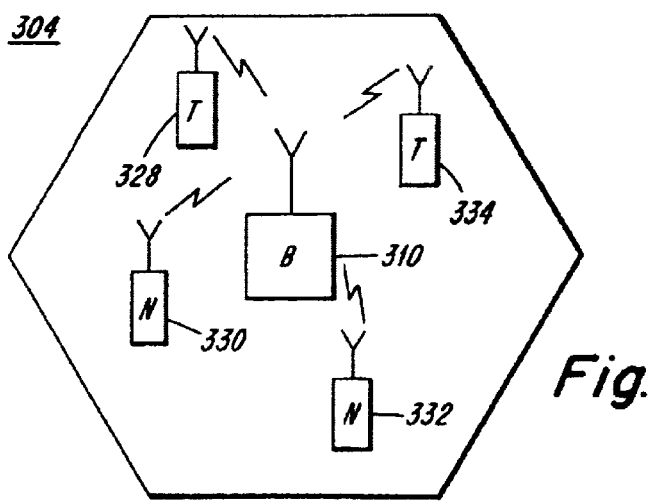

FIG. 3 (comprised of FIGS. 3(a), 3(b) and 3(c)) illustrates three different applications of the testing technique of the present invention.

In a first embodiment, FIG. 3(a) shows a cell 300 including base station 306 and an exemplary set of mobile stations 312, 314, 316 and 318. Mobile stations 312 and 314 are test mobile stations (designated by "T"), while mobile stations 318 and 316 are non-test mobile stations (designated by "N"). In the FIG. 3(a) scenario, the control system 200 has devoted all of the resources of cell 300 for exclusive use for test purposes. As such, test mobile stations 312 and 314 are permitted to communicate with the base station 306 of cell 300. Mobile stations 316 and 318, however, are prohibited from communicating with the base station 306 of the cell 300. Particularly, mobile station 316 remains in an inactive non-affiliated state. However, mobile station 318 has established connection with an alternative system (not shown) which has overlapping coverage with cell 300. For instance, the alternative system may represent an adjacent cell administered by the control system 200 with sufficient coverage to establish communication at the periphery of cell 300. Alternatively, the alternative system may represent any separate radio system (public, private, etc.) which has overlapping coverage with cell 300.

Figure 4A:
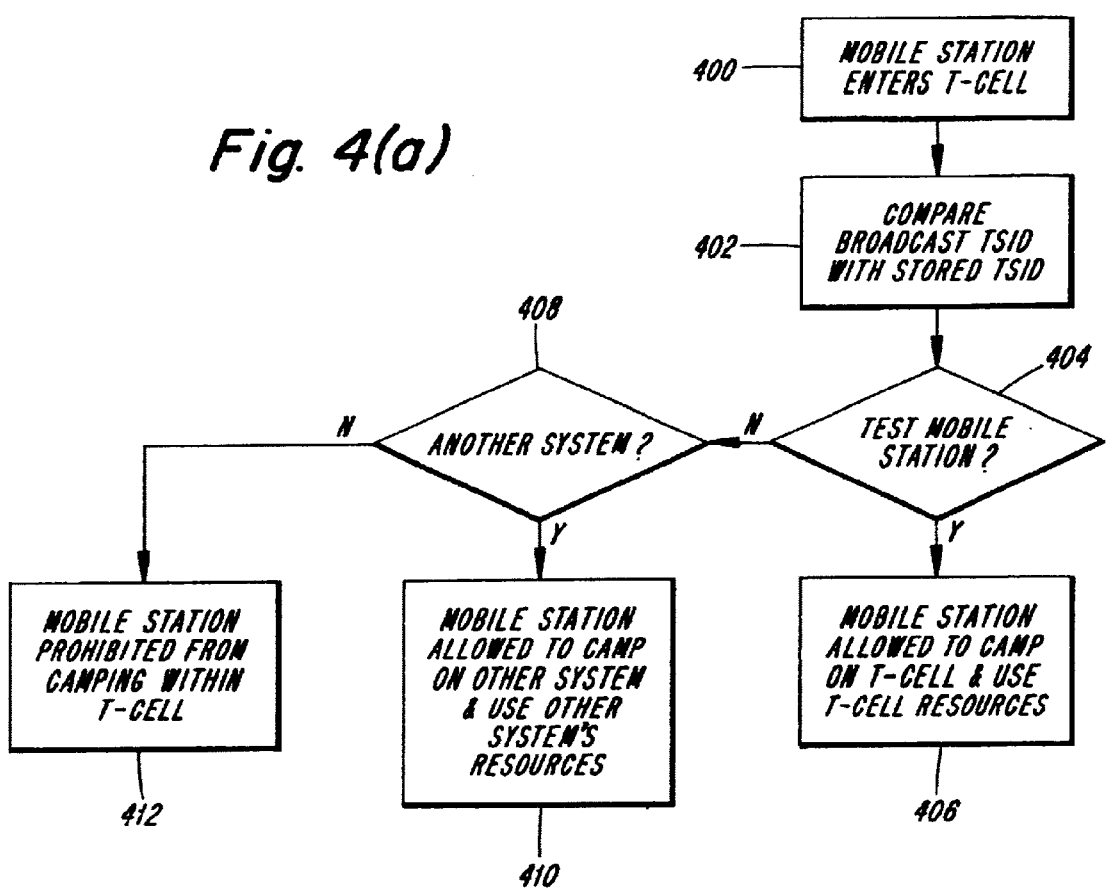
FIGS. 4(a) and 4(b) show two exemplary procedures for implementing the testing technique of the present invention according to respective first and second embodiments.

FIG. 4(a) shows one exemplary protocol which governs the operation of mobile stations within cell 300 of FIG. 3(a). With reference to that figure, the procedure starts in step 400 when a mobile station enters the test cell 300. Alternatively, a user may apply power to the mobile station within the coverage of the test cell 300. In any event, the control system 200 broadcasts TSID information via base station 306 into the cell 300. In step 402, the mobile station receives and compares the broadcast TSID value with its internally-stored TSID value (e.g., with reference to FIG. 2, the TSID value 208 stored in memory 206). If these codes agree (as ascertained in step 404), the communication system allows the mobile station to register with the test system and camp on the control channel used by base station 306 (step 406).

More specifically, the control system 200 may use a conventional registration protocol to register the location of the test mobile stations within the test cell 300. In such a protocol, the mobile station transmits a registration access message over the reverse control channel when the mobile station detects that it has roamed into the coverage area serviced by another system provider (in this case, the coverage area associated with a test system). The base station receives the registration access message and transfers it to the associated MSC. The MSC then informs the HLR that the location of the subscriber has changed. The MSC then sends a registration message to the mobile station via the base station to confirm that it has been registered with the new system.

Returning to FIG. 4(a), if the broadcast TSID value does not match the stored TSID value (e.g., where the mobile station does not contain a stored TSID value), the mobile station will scan other control channels associated with alternative systems that provide service to cell 300 (if available). As mentioned, the non-test mobile station may be able to establish connection with an adjacent cell, or establish connection with another system which provides coverage which overlaps with cell 300. If an alternative system is available (as ascertained in step 408), the non-test mobile station camps on the control channel associated with the alternative communication system (as indicated by step 410). For instance, as mentioned, non-test mobile station 318 in FIG. 3(a) has established connection with an alternative cell or system.

In the event that the non-test mobile station cannot establish connection with any communication system ("n" in step 408), it cannot camp on any control channel nor receive or transmit calls while located in the coverage of cell 300 (step 412). Mobile station 316 shown in FIG. 3(a) represents a station which cannot camp on any control channel. However, there are exceptions to this rule, such as where the mobile station 316 must send or receive an emergency call within the cell 300 (if the control system 200 so permits).

FIG. 3(b) shows an application similar to FIG. 3(a). The cell 302 includes a base station 308 and an exemplary set of mobile stations 320, 322, 324 and 326. Mobile stations 320, 324 and 326 are test mobile stations, while mobile station 326 is a non-test mobile station. In the FIG. 3(b) scenario, the control system 200 administers plural tests identified by plural respective TSID values. For instance, mobile station 324 belongs to a first test system (T1) which tests a first set of communication resources. Mobile station 324 accordingly stores a TSID value in its memory which pertain to the first test system. Mobile station 320 belongs to a second test system (T2) which tests a second set of communication resources, and accordingly stores a TSID value in its memory which pertains to the second test system. And finally, mobile station 322 belongs to a third test system (T3), and accordingly stores a TSID value in its memory which pertains to the third test system. Although not shown, any of the mobile stations can be associated with plural test systems by storing plural TSID values in its memory. On the other hand, mobile station 326 does not belong to any test system, and accordingly, like the case in FIG. 3(a), is prohibited from registering with the test system and camping on its control channel to send or receive calls.

The protocol shown in FIG. 4(a) can also govern the testing scenario shown in FIG. 3(b). In step 400, a mobile station enters the cell 302 or is powered-on within the cell 302. The mobile station then receives the control channel associated with the test cell 302 and compares the TSID values broadcast therein with its pre-stored TSID value (or values). In this case, the control channel may identify all of the test systems administered within the cell 302. Thus, the control message may contain three TSID values pertaining to tests systems T1, T2 and T3.

Upon receiving the TSID values in the control channel, each test mobile station notifies the base station 308 (and associated MSC) of its affiliation with the test system by transmitting its internally-stored TSID value to the base station. For instance, test mobile station 322 would transmit the TSID value corresponding to the test system T3. The mobile stations can forward their TSID values upon registration of the mobile station with the test system. Alternatively, the mobile station may forward this information in the process of setting up a call (e.g., sending or receiving a call). In either event, the control system 200 responds by providing the mobile station with the tests resources which match its test system affiliation (in step 406 of FIG. 4(*a*)).

Figure 4B:
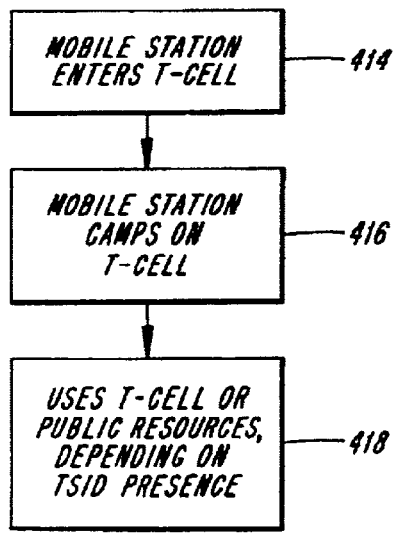

The remainder of FIG. 4(*a*) applies to FIG. 3(*b*) in the same manner discussed above with respect to FIG. 3(*a*). Namely, the protocol determines in step 408 whether a non-test mobile station can gain access to an alternative system that provides service to the test cell 302. If so, the mobile station establishes communication within the alternative system (in step 410). If not, the mobile station is prohibited from camping on any control channel within the test cell 302.

Finally, FIG. 3(*c*) represents another testing scenario according to a second embodiment. A cell 304 includes a base station 310 in communication with mobile stations 328, 330, 332 and 334. Mobile stations 328 and 334 are test mobile stations, while mobile stations 330 and 332 are non-test mobile stations. In the FIG. 3(*c*) scenario, the radio control system 200 permits both test mobiles stations (e.g., mobile stations 330 and 332) and non-test mobile stations (e.g., mobile stations 328 and 334) to camp on the control channel associated with the cell 304 and communicate within the cell via base station 310.

FIG. 4(*b*) shows an exemplary protocol for coordinating communication within cell 304. In step 414, a mobile station enters the test cell 304. In step 416, the mobile station monitors and gains access to the control channel associated with the cell 304 irrespective of whether or not the station is affiliated with the test system. The mobile station then informs the base station 310 (and associated higher-level nodes of the control system 200, e.g., the MSC) of its membership in the test system by transmitting its TSID information (or lack thereof) to the base station 310. The mobile station can transmit its TSID information either initially in the course of camping on the control channel and/or at a later point in time, e.g., in the course of transmitting or receiving a call. Alternatively, the mobile station can transmit other mobile-identifying information (e.g., "MIN" information) to the base station 310. The higher-level nodes of the control system 200 then correlate the mobile-identifying information with the test-membership status of the mobile station.

Once the control system 200 determines the system-affiliations of the mobile stations within the cell 304, it will allocate the appropriate resources to the mobile stations (indicated by step 418 of FIG. 4(*b*)). Namely, a test mobile station will be assigned appropriate test resources, while a non-test mobile station will be assigned appropriate non-test resources. For instance, the operator may assign a number of new antenna modules to the test system, and a number of "old" (previously deployed) antenna modules to the non-test system. Calls made or received by the test mobile stations would utilize the new antenna modules. Calls made or received by the non-test mobile stations would utilize the old antenna modules. The resource allocation logic for accomplishing this task is represented by block 214 in FIG. 2. In one non-limiting example, the allocation logic can be physically implemented at an appropriate base station node or MSC node of the control system 200.

The test analysis module 230 in FIG. 2 can be invoked to monitor the performance of various resources and to provide side-by-side comparisons of their performance. For instance, the operator could conveniently compare the performance of the above-referenced old and new antenna modules. The old antenna module would be referred to as the "baseline resource."

Incidentally, the protocol used in the FIG. 3(*c*) scenario can also be used in the FIG. 3(*b*) scenario. Namely, a mobile station in the FIG. 3(*b*) scenario can transmit its TSID information (or other mobile-identifying information) to the base station upon registration with the test system or on call set-up. There is thus no need to transmit the TSID information in the control channel, or to compare the broadcast TSID information with internally-stored TSID information.

In each of the above-identified cases, the geographic test domain pertains to a cell of the radio communication system administered by the control system 200. However, the test domain may comprise plural cells, and may even include the entire radio coverage of the radio communication system. A system-wide test domain might be appropriate when the monitored test resource comprises functionality within the MSC node.

In each of the above-identified cases, emphasis was placed on monitored test resources located in the base stations, MSCs, HLRs, etc. However, the monitored test resources can comprise hardware and/or software within the test mobile stations 202.

Further, the test mobile station may also contain a number of other system affiliations. For instance, a test mobile station may belong to a private system (indicated by a private system IDentification or PSID number) or a residential system (indicated by a Residential System IDentification or RSID number). Furthermore, these alternative systems may have coverage which overlaps with the test region (e.g., occupied test cell or cells) of the test system. The mobile stations may be configured to handle this situation by attempting to gain access to the test system in preference to other systems. Upon failure in establishing contact with the test system, the mobile station would then access a private or public system. (Generally, the mobile station will attempt to gain access to a private system prior to a public system.)

The control system 200 can deactivate the test systems upon the completion of testing activities. The control system 200 may then allow all subscribers to access former test resources.

In conclusion, the distinction between test mobile stations and non-test mobile stations is fundamentally based on the system-affiliation status of mobile stations, rather than on subscriber categories maintained in the HLR node of the communication system. This new way for defining groups of test stations is significantly easier to implement than the prior methodology, as it does not require detailed routing changes to subscriber categories maintained by the MSC and/or HLR nodes of the radio communication system.

Other variations of the above described principles will be apparent to those skilled in the art. All such variations and modifications are considered to be within the scope and spirit of the present invention as defined by the following claims.

What is claimed is:

1. A method of testing a communication network having a plurality of communication resources for communicating with a plurality of mobile stations, said method comprising the steps of:

establishing a Test System Identification value (TSID value) to represent a test system and associated test activities within the communication network, said test system including network communication resources under test;

storing the TSID value in an internal memory in at least one conventional mobile station operating in the communication system, thereby associating the at least one conventional mobile station with the test system;

determining whether a particular conventional mobile station within the coverage area of the test system is associated with the test system by determining whether the particular conventional mobile station has the TSID value stored in its internal memory;

providing communication resources under test to the particular conventional mobile station, upon determining that the mobile station is associated with the test system; and performing the associated test activities utilizing the network communication resources under test and the conventional mobile station.

2. The method according to claim 1, further comprising prohibiting the mobile station from camping on a control channel associated with the test system, upon determining that the mobile station is not associated with the test system.

3. The method according to claim 2, further comprising, upon determining that the mobile station is not associated with the test system, the step of scanning by the mobile station to determine the availability of other communication resources within the coverage area of the test system.

4. The method according to claim 3, further comprising providing alternative communication resources to the mobile station from the communication network or another system, upon determining that other communication resources are available.

5. The method according to claim 1, wherein the step of determining whether the particular mobile station is association with the test system comprises the steps of:

broadcasting the TSID value on a control channel from the communication network to the particular mobile station;

detecting, by the mobile station, the broadcast TSID value;

comparing the broadcast TSID value with the stored TSID value stored within the mobile station; and identifying the particular mobile station as being associated with the test system if the broadcast TSID value matches the stored TSID value stored in the mobile station.

6. The method according to claim 5, wherein a plurality of test systems are under test within the communication network, and each test system is assigned a different TSID value, and wherein:

the step of storing the TSID value in an internal memory in mobile stations that are associated with the test system includes storing a plurality of TSID values in the internal memory of each mobile station, the plurality of stored TSID values indicating the test systems with which each mobile station is associated;

the step of broadcasting the TSID value on a control channel includes broadcasting a plurality of TSID values corresponding to the plurality of test systems under test;

the step of comparing the broadcast TSID value with the stored TSID value includes comparing each of the broadcast TSID values with the stored TSID values stored within each mobile station; and the step of identifying the particular mobile station includes identifying each mobile station as being associated with one or more of the plurality of test systems if the broadcast TSID values match one or more stored TSID values stored in the mobile station.

7. The method according to claim 6, further comprising transmitting a system-affiliation message from the mobile station to the communication network, said system-affiliation message identifying the test systems with which the mobile station is affiliated by identifying the broadcast TSID values which match the one or more stored TSID values.

8. The method according to claim 1, wherein the step of determining whether a particular mobile station is associated with the test system includes the steps of:

transmitting the stored TSID value from the mobile station to the communication network; and determining by the communication network that the transmitted TSID value is associated with the test system.

9. The method according to claim 1, further comprising the steps of:

monitoring the performance of a monitored communication resource within the test system;

monitoring the performance of a baseline resource; and comparing the performances of the baseline resource and the monitored communication resource.

10. A system for testing a communication network comprising:

a communication control system which establishes a Test System Identification value (TSID value) to represent a test system and associated communication resources;

a conventional mobile station in communication with the control system, said conventional mobile station including a memory in which the TSID value is stored if the conventional mobile station is associated with the test system;

means for determining whether the conventional mobile station is affiliated with the test system by determining whether the conventional mobile station has the TSID value stored in its internal memory; and means within the control system for allocating the communication resources of the test system to the conventional mobile station only when it is determined that the conventional mobile station is affiliated with the test system.

11. The system according to claim 10, wherein the control system prohibits the mobile station from camping on a control channel associated with the test system in response to determining that the mobile station is not associated with the test system.

12. The system according to claim 11, wherein the mobile station includes means for determining the availability of other communication resources in response to being prohibited from camping on the control channel associated with the test system.

13. The system according to claim 10, wherein the means for determining whether the mobile station is affiliated with the test system includes:

means for broadcasting the TSID value on a control channel from the control system to the mobile station;

means for detecting the broadcast TSID value by the mobile station; and means within the mobile station for comparing the broadcast TSID value with the stored TSID value stored within the mobile station.

14. The system according to claim 13, wherein a plurality of test systems are under test within the communication network, and each test system is assigned a different TSID value, and wherein:

the Internal memory in the mobile station stores a plurality of TSID values indicating the test systems with which the mobile station is associated;

the means for broadcasting the TSID value includes means for broadcasting a plurality of TSID values corresponding to the plurality of test systems under test; and the means for comparing the broadcast TSID value with the stored TSID value in the mobile station includes means for comparing each of the broadcast TSID values with the plurality of stored TSID values stored within the mobile station.

15. The system according to claim 14, wherein the mobile station includes means for transmitting a system-affiliation message to the control system, said system-affiliation message identifying the test systems with which the mobile station is affiliated by identifying the broadcast TSID values which match the stored values.

16. The system according to claim 10, wherein the means for determining whether a mobile station is associated with the test system includes:

means within the mobile station for transmitting the stored TSID value to the control system; and means within the control system for determining that the transmitted TSID value is associated with the test system.

17. The system according to claim 10, further comprising:

means for monitoring the performance of a monitored communication resource within the test system;

means for monitoring the performance of a baseline resource; and means for comparing the performances of the monitored communication resource and the baseline resource.

* * * * *